(12) United States Patent
Balasubramanian et al.

(10) Patent No.: US 8,670,326 B1
(45) Date of Patent: Mar. 11, 2014

(54) SYSTEM AND METHOD FOR PROBING MULTIPLE PATHS IN A NETWORK ENVIRONMENT

(75) Inventors: Hariharan Balasubramanian, Oak Park, CA (US); Smita Rai, Mountain View, CA (US); Sanjay Sane, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 238 days.

(21) Appl. No.: 13/077,828

(22) Filed: Mar. 31, 2011

(51) Int. Cl.
- *H04L 12/26* (2006.01)
- *H04L 12/28* (2006.01)
- *H04L 12/56* (2011.01)
- *G06F 15/16* (2006.01)
- *G06F 15/173* (2006.01)
- *G06F 9/26* (2006.01)

(52) U.S. Cl.
USPC ...... 370/238; 370/252; 370/392; 370/395.32; 709/227; 709/238; 711/216

(58) Field of Classification Search
USPC .............. 370/248, 351, 394, 238, 238.1, 252, 370/253, 392, 395.32; 709/238, 241, 227; 711/216
See application file for complete search history.

(56) References Cited

U.S. PATENT DOCUMENTS

| | | |
|---|---|---|
| 4,006,320 A | 2/1977 | Markl |
| 4,486,877 A | 12/1984 | Turner |
| 4,569,042 A | 2/1986 | Larson |
| 4,630,268 A | 12/1986 | Rodenbaugh |
| 4,907,277 A | 3/1990 | Callens et al. |
| 5,010,544 A | 4/1991 | Chang et al. |
| 5,014,265 A | 5/1991 | Hahne et al. |
| 5,121,382 A | 6/1992 | Yang et al. |
| 5,159,592 A | 10/1992 | Perkins |
| 5,243,342 A | 9/1993 | Kattemalalavadi et al. |
| 5,265,092 A | 11/1993 | Soloway et al. |
| 5,274,643 A | 12/1993 | Fisk |
| 5,321,694 A | 6/1994 | Chang et al. |
| 5,341,477 A | 8/1994 | Pitkin et al. |
| 5,343,461 A | 8/1994 | Barton et al. |
| 5,353,283 A | 10/1994 | Tsuchiya |
| 5,371,852 A | 12/1994 | Attanasio et al. |
| 5,394,402 A | 2/1995 | Ross |

(Continued)

FOREIGN PATENT DOCUMENTS

| | | |
|---|---|---|
| WO | WO 2008/010918 | 1/2008 |
| WO | WO 2009/014967 | 1/2009 |

OTHER PUBLICATIONS

U.S. Appl. No. 13/152,300, filed Jun. 2, 2011, entitled "System and Method for Managing Network Traffic Disruption," Inventor(s): Shekher Bulusu, et al.

(Continued)

*Primary Examiner* — Alpus H Hsu
*Assistant Examiner* — Dharmesh Patel
(74) *Attorney, Agent, or Firm* — Patent Capital Group

(57) ABSTRACT

An example method is provided and can include initiating a probe session at a source network element; identifying multiple paths from the source network element to a destination network element in a network; transmitting packets from the source network element along the multiple paths; compiling a list of network characteristics associated with the multiple paths; and selecting a particular one of the multiple paths for packet routing based on the network characteristics.

20 Claims, 7 Drawing Sheets

(56) References Cited

U.S. PATENT DOCUMENTS

| | | |
|---|---|---|
| 5,416,842 A | 5/1995 | Aziz |
| 5,422,876 A | 6/1995 | Turudic |
| 5,426,637 A | 6/1995 | Derby et al. |
| 5,430,715 A | 7/1995 | Corbalis et al. |
| 5,430,727 A | 7/1995 | Callon |
| 5,450,394 A | 9/1995 | Gruber |
| 5,450,449 A | 9/1995 | Kroon |
| 5,452,294 A | 9/1995 | Natarajan |
| 5,459,837 A | 10/1995 | Caccavale |
| 5,473,599 A | 12/1995 | Li et al. |
| 5,477,531 A | 12/1995 | McKee et al. |
| 5,491,692 A | 2/1996 | Gunner et al. |
| 5,500,851 A | 3/1996 | Kozaki et al. |
| 5,500,860 A | 3/1996 | Perlman et al. |
| 5,509,123 A | 4/1996 | Dobbins et al. |
| 5,519,704 A | 5/1996 | Farinacci et al. |
| 5,521,907 A | 5/1996 | Ennis et al. |
| 5,555,256 A | 9/1996 | Calamvokis |
| 5,561,669 A | 10/1996 | Lenney et al. |
| 5,563,875 A | 10/1996 | Hefel et al. |
| 5,594,732 A | 1/1997 | Bell et al. |
| 5,602,918 A | 2/1997 | Chen et al. |
| 5,604,803 A | 2/1997 | Aziz |
| 5,617,417 A | 4/1997 | Sathe et al. |
| 5,617,421 A | 4/1997 | Chin et al. |
| 5,621,721 A | 4/1997 | Vantuone |
| 5,623,492 A | 4/1997 | Teraslinna |
| 5,623,605 A | 4/1997 | Keshav et al. |
| 5,642,515 A | 6/1997 | Jones et al. |
| 5,650,993 A | 7/1997 | Lakshman et al. |
| 5,651,002 A | 7/1997 | Van Seters et al. |
| 5,659,542 A | 8/1997 | Bell et al. |
| 5,673,265 A | 9/1997 | Gupta et al. |
| 5,675,741 A | 10/1997 | Aggarwal et al. |
| 5,689,566 A | 11/1997 | Nguyen |
| 5,699,478 A | 12/1997 | Nahumi |
| 5,699,485 A | 12/1997 | Shoham |
| 5,708,502 A | 1/1998 | Denton et al. |
| 5,715,399 A | 2/1998 | Bezos |
| 5,740,171 A | 4/1998 | Mazzola et al. |
| 5,740,176 A | 4/1998 | Gupta et al. |
| 5,742,604 A | 4/1998 | Edsall et al. |
| 5,764,636 A | 6/1998 | Edsall |
| 5,793,763 A | 8/1998 | Mayes et al. |
| 5,812,528 A | 9/1998 | VanDervort |
| 5,819,089 A | 10/1998 | White |
| 5,835,494 A | 11/1998 | Hughes et al. |
| 5,838,994 A | 11/1998 | Valizadeh |
| 5,850,388 A | 12/1998 | Anderson et al. |
| 5,867,666 A | 2/1999 | Harvey |
| 5,870,397 A | 2/1999 | Chauffour et al. |
| 5,870,557 A | 2/1999 | Bellovin et al. |
| 5,884,010 A | 3/1999 | Chen et al. |
| 5,894,556 A | 4/1999 | Grimm et al. |
| 5,905,871 A | 5/1999 | Buskens et al. |
| 5,917,820 A | 6/1999 | Rekhter |
| 5,918,017 A | 6/1999 | Attanasio et al. |
| 5,918,019 A | 6/1999 | Valencia |
| 5,931,961 A | 8/1999 | Ranganathan et al. |
| 5,943,347 A | 8/1999 | Shepard |
| 5,983,265 A | 11/1999 | Martino, II |
| 5,987,011 A | 11/1999 | Toh |
| 5,991,809 A | 11/1999 | Kriegsman |
| 6,003,079 A | 12/1999 | Friedrich et al. |
| 6,006,264 A | 12/1999 | Colby et al. |
| 6,009,081 A | 12/1999 | Wheeler et al. |
| 6,018,516 A | 1/2000 | Packer |
| 6,023,455 A | 2/2000 | Takahashi |
| 6,023,733 A | 2/2000 | Periasamy et al. |
| 6,031,846 A | 2/2000 | Gurusami et al. |
| 6,032,194 A | 2/2000 | Gai et al. |
| 6,041,352 A | 3/2000 | Burdick et al. |
| 6,061,454 A | 5/2000 | Malik et al. |
| 6,070,190 A | 5/2000 | Reps et al. |
| 6,078,590 A | 6/2000 | Farinacci et al. |
| 6,078,956 A | 6/2000 | Bryant et al. |
| 6,088,717 A | 7/2000 | Reed et al. |
| 6,094,562 A | 7/2000 | Zhong |
| 6,101,180 A | 8/2000 | Donahue et al. |
| 6,104,695 A | 8/2000 | Wesley et al. |
| 6,115,711 A | 9/2000 | White |
| 6,115,752 A | 9/2000 | Chauhan |
| 6,118,765 A | 9/2000 | Phillips |
| 6,118,796 A | 9/2000 | Best et al. |
| 6,185,203 B1 | 2/2001 | Berman |
| 6,192,036 B1 | 2/2001 | Buhler et al. |
| 6,230,271 B1 | 5/2001 | Wadlow et al. |
| 6,252,851 B1 | 6/2001 | Siu et al. |
| 6,275,471 B1 | 8/2001 | Bushmitch et al. |
| 6,278,687 B1 | 8/2001 | Hunneyball |
| 6,286,045 B1 | 9/2001 | Griffiths et al. |
| 6,317,775 B1 | 11/2001 | Coile et al. |
| 6,337,861 B1 | 1/2002 | Rosen |
| 6,356,545 B1 | 3/2002 | Vargo et al. |
| 6,363,477 B1 | 3/2002 | Fletcher et al. |
| 6,389,006 B1 | 5/2002 | Bialik |
| 6,445,717 B1 | 9/2002 | Gibson et al. |
| 6,446,121 B1 | 9/2002 | Shah et al. |
| 6,510,150 B1 | 1/2003 | Ngo |
| 6,515,967 B1 | 2/2003 | Wei et al. |
| 6,526,044 B1 | 2/2003 | Cookmeyer et al. |
| 6,535,490 B1 | 3/2003 | Jain |
| 6,563,796 B1 | 5/2003 | Saito |
| 6,578,066 B1 | 6/2003 | Logan et al. |
| 6,584,438 B1 | 6/2003 | Manjunath et al. |
| 6,614,781 B1 | 9/2003 | Elliott et al. |
| 6,628,624 B1 | 9/2003 | Mahajan et al. |
| 6,665,637 B2 | 12/2003 | Bruhn |
| 6,680,921 B1 | 1/2004 | Svanbro et al. |
| 6,687,225 B1 | 2/2004 | Kawari et al. |
| 6,687,360 B2 | 2/2004 | Kung et al. |
| 6,700,874 B1 | 3/2004 | Takihiro et al. |
| 6,725,191 B2 | 4/2004 | Mecayten |
| 6,731,609 B1 | 5/2004 | Hirni et al. |
| 6,741,600 B1 | 5/2004 | Weiss et al. |
| 6,757,654 B1 | 6/2004 | Westerlund et al. |
| 6,765,881 B1 | 7/2004 | Rajakarunanayake |
| 6,775,703 B1 | 8/2004 | Burns et al. |
| 6,785,261 B1 | 8/2004 | Schuster et al. |
| 6,798,739 B1 | 9/2004 | Lee |
| 6,804,244 B1 | 10/2004 | Anandakumar et al. |
| 6,836,804 B1 | 12/2004 | Jagadeesan |
| 6,839,353 B1 | 1/2005 | DeJager |
| 6,845,091 B2 | 1/2005 | Ogier et al. |
| 6,901,048 B1 | 5/2005 | Wang et al. |
| 6,917,983 B1 | 7/2005 | Li |
| 6,940,821 B1 | 9/2005 | Wei et al. |
| 6,944,132 B1 | 9/2005 | Aono et al. |
| 6,947,381 B2 | 9/2005 | Wen et al. |
| 7,013,267 B1 | 3/2006 | Huart et al. |
| 7,024,257 B2 | 4/2006 | Pearce et al. |
| 7,039,716 B1 | 5/2006 | Jagadeesan |
| 7,047,190 B1 | 5/2006 | Kapilow |
| 7,068,607 B2 | 6/2006 | Partain et al. |
| 7,069,034 B1 | 6/2006 | Sourour |
| 7,072,968 B2 | 7/2006 | Mikami et al. |
| 7,099,820 B1 | 8/2006 | Huart et al. |
| 7,133,368 B2 | 11/2006 | Zhang et al. |
| 7,143,184 B1 | 11/2006 | Shah et al. |
| 7,212,517 B2 | 5/2007 | Dzik |
| 7,283,474 B1 | 10/2007 | Bergenwall |
| 7,286,467 B1 | 10/2007 | Sylvain |
| 7,289,454 B2 | 10/2007 | Bovo et al. |
| 7,310,334 B1 | 12/2007 | FitzGerald et al. |
| 7,336,620 B2 | 2/2008 | Bennett |
| 7,352,700 B2 | 4/2008 | Chan et al. |
| 7,352,705 B1 | 4/2008 | Adhikari et al. |
| 7,406,034 B1 | 7/2008 | Cometto et al. |
| 7,417,993 B1 | 8/2008 | Ebergen et al. |
| 7,426,577 B2 | 9/2008 | Bardzil et al. |
| 7,457,877 B1 | 11/2008 | Shah et al. |
| 7,483,370 B1 | 1/2009 | Dayal et al. |
| 7,496,044 B1 | 2/2009 | Wing |
| 7,519,006 B1 | 4/2009 | Wing |

(56) References Cited

U.S. PATENT DOCUMENTS

| | | |
|---|---|---|
| 7,564,858 B1 | 7/2009 | Moncada-Elias et al. |
| 7,643,430 B2 | 1/2010 | Morandin |
| 7,660,314 B2 | 2/2010 | Wybenga et al. |
| 7,672,227 B2 | 3/2010 | Santoso et al. |
| 7,729,267 B2 | 6/2010 | Oran et al. |
| 7,760,735 B1 | 7/2010 | Chen et al. |
| 7,817,580 B2 | 10/2010 | Jain et al. |
| 7,864,712 B2 | 1/2011 | Khan et al. |
| 7,870,611 B2 | 1/2011 | Ishikawa |
| 7,886,080 B2 | 2/2011 | Sajassi et al. |
| 7,944,470 B2 | 5/2011 | Foster et al. |
| 7,969,894 B2 | 6/2011 | Mangal |
| 8,065,317 B2 | 11/2011 | Wang et al. |
| 8,116,213 B2 | 2/2012 | Krygowski |
| 8,174,996 B2 | 5/2012 | Omar |
| 8,244,909 B1 | 8/2012 | Hanson et al. |
| 8,291,077 B2 | 10/2012 | I'Anson |
| 2002/0003775 A1 | 1/2002 | Nakano et al. |
| 2002/0067693 A1 | 6/2002 | Kodialam et al. |
| 2002/0073375 A1 | 6/2002 | Hollander |
| 2002/0083186 A1 | 6/2002 | Stringer |
| 2003/0053419 A1 | 3/2003 | Kanazawa et al. |
| 2003/0072269 A1 | 4/2003 | Teruhi et al. |
| 2003/0097438 A1 | 5/2003 | Bearden et al. |
| 2003/0110276 A1 | 6/2003 | Riddle |
| 2003/0137972 A1 | 7/2003 | Kowalewski et al. |
| 2003/0142680 A1 | 7/2003 | Oguchi |
| 2003/0163772 A1 | 8/2003 | Jaworski |
| 2003/0165114 A1 | 9/2003 | Kusama et al. |
| 2003/0208616 A1 | 11/2003 | Laing et al. |
| 2003/0219022 A1 | 11/2003 | Dillon et al. |
| 2003/0220971 A1 | 11/2003 | Kressin |
| 2003/0225549 A1* | 12/2003 | Shay et al. ............. 702/182 |
| 2004/0008715 A1 | 1/2004 | Barrack et al. |
| 2004/0052257 A1 | 3/2004 | Abdo et al. |
| 2004/0073690 A1 | 4/2004 | Hepworth et al. |
| 2004/0114539 A1 | 6/2004 | Beshai et al. |
| 2004/0125965 A1 | 7/2004 | Alberth et al. |
| 2004/0170163 A1 | 9/2004 | Yik et al. |
| 2004/0184323 A1 | 9/2004 | Mori et al. |
| 2004/0193709 A1 | 9/2004 | Selvaggi et al. |
| 2004/0218617 A1 | 11/2004 | Sagfors |
| 2004/0223458 A1 | 11/2004 | Gentle |
| 2004/0240431 A1 | 12/2004 | Makowski et al. |
| 2004/0252646 A1 | 12/2004 | Adhikari et al. |
| 2005/0036519 A1 | 2/2005 | Balakrishnan et al. |
| 2005/0105474 A1 | 5/2005 | Metzler |
| 2005/0111487 A1 | 5/2005 | Matta et al. |
| 2005/0117576 A1 | 6/2005 | McDysan et al. |
| 2005/0152406 A2* | 7/2005 | Chauveau ............. 370/503 |
| 2005/0216599 A1 | 9/2005 | Anderson et al. |
| 2005/0220123 A1 | 10/2005 | Wybenga et al. |
| 2005/0226172 A1 | 10/2005 | Richardson |
| 2005/0243733 A1 | 11/2005 | Crawford et al. |
| 2005/0246041 A1 | 11/2005 | Kreifeldt et al. |
| 2005/0259597 A1 | 11/2005 | Benedetto et al. |
| 2005/0283639 A1 | 12/2005 | Le Pennec et al. |
| 2005/0286419 A1 | 12/2005 | Joshi et al. |
| 2005/0286436 A1 | 12/2005 | Flask |
| 2006/0018333 A1 | 1/2006 | Windisch et al. |
| 2006/0041431 A1 | 2/2006 | Maes |
| 2006/0098586 A1 | 5/2006 | Farrell et al. |
| 2006/0104217 A1 | 5/2006 | Lehane |
| 2006/0104306 A1 | 5/2006 | Adamczyk et al. |
| 2006/0112400 A1 | 5/2006 | Zhang et al. |
| 2006/0122835 A1 | 6/2006 | Huart et al. |
| 2006/0133286 A1 | 6/2006 | Elie-Dit-Cosaque et al. |
| 2006/0140136 A1 | 6/2006 | Filsfils et al. |
| 2006/0159029 A1 | 7/2006 | Samuels et al. |
| 2006/0179338 A1 | 8/2006 | Sumner |
| 2006/0215684 A1 | 9/2006 | Capone |
| 2006/0250967 A1 | 11/2006 | Miller et al. |
| 2006/0268742 A1 | 11/2006 | Chu et al. |
| 2006/0274760 A1 | 12/2006 | Loher |
| 2006/0280130 A1 | 12/2006 | Nomura et al. |
| 2006/0291385 A1 | 12/2006 | Yang |
| 2007/0041335 A1 | 2/2007 | Znamova et al. |
| 2007/0058571 A1 | 3/2007 | Rose |
| 2007/0064616 A1 | 3/2007 | Miranda |
| 2007/0107034 A1 | 5/2007 | Gotwals |
| 2007/0127395 A1 | 6/2007 | Jain et al. |
| 2007/0150480 A1 | 6/2007 | Hwang et al. |
| 2007/0153774 A1 | 7/2007 | Shay et al. |
| 2007/0171835 A1 | 7/2007 | Gobara et al. |
| 2007/0204017 A1 | 8/2007 | Maes |
| 2007/0212065 A1 | 9/2007 | Shin et al. |
| 2007/0223462 A1 | 9/2007 | Hite et al. |
| 2007/0258359 A1 | 11/2007 | Ogasawara et al. |
| 2007/0263554 A1 | 11/2007 | Finn |
| 2007/0286165 A1 | 12/2007 | Chu et al. |
| 2008/0019282 A1 | 1/2008 | Alaria et al. |
| 2008/0031149 A1* | 2/2008 | Hughes et al. ............. 370/252 |
| 2008/0031154 A1 | 2/2008 | Niazi et al. |
| 2009/0022069 A1 | 1/2009 | Khan et al. |
| 2009/0028044 A1 | 1/2009 | Windisch et al. |
| 2009/0059800 A1 | 3/2009 | Mohan |
| 2009/0080334 A1* | 3/2009 | DeCusatis et al. ............ 370/237 |
| 2009/0125595 A1 | 5/2009 | Maes |
| 2009/0144403 A1 | 6/2009 | Sajassi et al. |
| 2009/0175274 A1 | 7/2009 | Aggarwal et al. |
| 2009/0193057 A1 | 7/2009 | Maes |
| 2009/0201937 A1 | 8/2009 | Bragg et al. |
| 2009/0219823 A1 | 9/2009 | Qian et al. |
| 2009/0219836 A1 | 9/2009 | Khan et al. |
| 2009/0274153 A1 | 11/2009 | Kuo et al. |
| 2009/0296588 A1 | 12/2009 | Nishi et al. |
| 2009/0328051 A1 | 12/2009 | Maes |
| 2010/0049826 A1 | 2/2010 | Maes |
| 2010/0061254 A1 | 3/2010 | Thottakkara et al. |
| 2010/0061269 A1 | 3/2010 | Banerjee et al. |
| 2010/0069052 A1 | 3/2010 | Ahomaki et al. |
| 2010/0182937 A1 | 7/2010 | Bellagamba |
| 2010/0189118 A1* | 7/2010 | Nonaka ............. 370/401 |
| 2010/0226244 A1 | 9/2010 | Mizutani et al. |
| 2010/0302936 A1 | 12/2010 | Jan et al. |
| 2011/0019678 A1 | 1/2011 | Mehta et al. |
| 2011/0134804 A1 | 6/2011 | Maes |
| 2012/0106339 A1 | 5/2012 | Mishra et al. |

OTHER PUBLICATIONS

U.S. Appl. No. 13/160,957, filed Jun. 15, 2011, entitled "System and Method for Providing a Loop Free Topology in a Network Environment," Inventor(s): Shekher Bulusu, et al.

U.S. Appl. No. 11/297,882, filed Dec. 7, 2005, entitled "Preventing Transient Loops in Broadcast/Multicast Trees During Distribution of Link State Information," Inventor: Sachin Jain.

U.S. Appl. No. 11/378,990, filed Mar. 17, 2006, entitled "Preventing Transient Loops in Broadcast/Multicast Trees During Distribution of Link State Information," Inventor: Sachin Jain.

U.S. Appl. No. 11/490,806, filed Jul. 20, 2006, entitled "Methods and Apparatus for Improved Determination of Network Metrics," Inventor: Valentina Alaria.

U.S. Appl. No. 11/880,322 filed Jul. 20, 2007, entitled "Preventing Loops in Networks Operating Different Protocols to Provide Loop-Free Topology," Inventor: Tameen Khan.

U.S. Appl. No. 12/475,124, filed May 29, 2009, entitled "Transient Loops Prevention in a Hybrid Layer-2 Network," Inventor: Saurabh Jain.

U.S. Appl. No. 12/658,503, filed Feb. 5, 2010, entitled "Fault Isolation in Trill Networks," Inventor(s): Ali Sajassi et al.

U.S. Appl. No. 12/916,763, filed Nov. 1, 2010, entitled "Probing Specific Customer Flow in Layer-2 Multipath Networks," Inventor(s): Chandan Mishra et al.

U.S. Appl. No. 12/938,237, filed Nov. 2, 2010, entitled "System and Method for Providing Proactive Fault Monitoring in a Network Environment," Inventor(s): Chandan Mishra, et al.

U.S. Appl. No. 12/941,881, filed Nov. 8, 2010, entitled "System and Method for Providing a Loop Free Topology in a Network Environment," Inventor: Shekher Bulusu.

U.S. Appl. No. 13/041,148, filed Mar. 4, 2011, entitled "System and Method for Managing Topology Changes in a Network Environment," Inventor: Shekher Bulusu.

(56) References Cited

OTHER PUBLICATIONS

Wikipedia, "IEEE 802.1ag," Connectivity Fault Management, retrieve and printed Nov. 2, 2010, 4 pages; http://en.wikipedia.org/wiki/IEEE_802.1ag.
G. Malkin, "Traceroute Using an IP Option," Network Working Group, RFC 1393, Jan. 1993, 8 pages; http://tools.ietf.org/pdf/rfc1393.pdf.
K. Kompella and G. Swallow, "Detecting Multi-Protocol Label Switched (MPLS) Data Plane Failures," Network Working Group, RFC 4379, Feb. 2006, 52 pages; http://tools.ietf.org/pdf/rfc4379.pdf.
PCT "International Preliminary Report on Patentability, Date of Issuance Jan. 20, 2009 (1 page), Written Opinion of the International Searching Authority, Date of Mailing Feb. 7, 2008 (6 pages) and International Search Report, Date of Mailing Feb. 7, 2008 (2 pages)," for PCT/US2007/015506.
PCT "International Preliminary Report on Patentability (dated Jan. 26, 2010; 1 page) and Written Opinion of the International Searching Authority and International Search Report (dated Oct. 2, 2008; 7 pages)," for PCT International Application PCT/US2008/070243.
IEEE Standards Department, "Virtual Bridged Local Area Networks—Amendment 6: Provider Backbone Bridges—IEEE P802.1ah/D4.2," ©2008, Institute of Electrical and Electronics Engineers, Inc., Mar. 26, 2008; 116 pages.
USPTO Aug. 26, 2013 Response to Jun. 20, 2013 Non-Final Office Action from U.S. Appl. No. 13/041,148.
USPTO Jul. 5, 2013 Non-Final Office Action from U.S. Appl. No. 13/152,200.
USPTO Jun. 13, 2013 RCE Response to Mar. 26, 2013 Final Office Action from U.S. Appl. No. 12/938,237.
USPTO Jul. 19, 2013 Non-Final Office Action from U.S. Appl. No. 12/938,237.
USPTO Aug. 6, 2013 RCE Response to May 8, 2013 Final Office Action from U.S. Appl. No. 13/160,957.
Callon et al., "A Framework for Multiprotocol Label Switching," IETF Network Working Group, Internet Draft draft-ietf-mpls-framework-02.txt, Nov. 21, 1997.
Deering, S., et al., "Internet Protocol Version 6," RFC 1883, Dec. 1995.
Feldman, N., "ARIS Specification," Internet Draft, Mar. 1997.
Gobrial, Margret N., "Evaluation of Border Gateway Protocol (BGP) Version 4(V4) in the Tactical Environment," Military Communications Conference, Oct. 21-24, 1996; Abstract Only http://ieeexplore.ieee.org/xpl/login.jsp?tp=&arnumber=569372&url=http%3A%2F%2Fieeexplore.ieee.org%2Fiel3%2F4198%2F12335%2F00569372.pdf%3Farnumber%3D569372.
Halabi, Bassam, *Internet Routing Architectures* (CISCO), Macmillan Technical Publishing, Apr. 23, 1997; Abstract and Table of Contents only. http://www.ciscopress.com/store/internet-routing-architectures-cisco-9781562056520.
Handley and V. Jacobson, "SDP: Session Description Protocol," RFC 2327; Apr. 1998, 43pgs.
Heinanen, J., "Multiprotocol Encapsulation over ATM Adaptation Layer 5," RFC 1483, Jul. 1993.
IEEE Standards Department, "Virtual Bridged Local Area Networks—Amendment 9: Shortest Path Bridging—IEEE P802.1aq/D2.1," ©2009, Institute of Electrical and Electronics Engineers, Inc., Aug. 21, 2009; 208 pages.
Jennings, C., "NAT Classification Test Results," Internet Draft draft-jennings-behave-test-results-02draft-jennings-behave-test-results-02.txt, Jun. 25, 2006.
Katsube, Y. et al., "Toshiba's Router Architecture Extensions for ATM: Overview," RFC 2098, Feb. 1997.
Kessler, G., "Chapter 2.2 PING of TCP: A Primer on Internet and TCP/IP Tools," RFC 1739; Dec. 1994; www.ietf.org.
Laubach, M., "Classical IP and ARP over ATM," RFC 1577, Jan. 1994.
Laubach, M., "IP over ATM Working Group's Recommendations for the ATM Forum's Multiprotocol BOF Version 1," RFC 1754, Jan. 1995.
Liao et al., "Adaptive Recovery Techniques for Real-time Audio Streams," IEEE INFOCOM2001; Twentieth Annual Joint Conference of the Iee Computer and Communications Societies Proceedings, Apr. 22-26, 2001, vol. 2, pp. 815-823.
McGovern, M., et al., "CATNIP: Common Architecture for the Internet," RFC 1707, Oct. 1994.
Nagami, K., et al., "Toshiba's Flow Attribute Notification Protocol (FANP) Specification," RFC 2129, Apr. 1997.
Newman, P. et al., "Ipsilon Flow Management Protocol Specification for IPv4 Version 1.0," RFC 1953, May 1996.
Newman, P. et al., "Ipsilon's General Switch Management Protocol Specification Version 1.1," RFC 1987, Aug. 1996.
Niccolini, S., et al. "How to store traceroute measurements and related metrics," Internet Draft draft-niccolini-ippm-storetraceroutes-02.txe., Oct. 24, 2005.
PCT Feb. 7, 2008 International Search Report for PCT/US2007/015506.
Perez, M., et al., "ATM Signaling Support for IP over ATM," RFC 1755, Feb. 1995.
Perlman, et al., "Rbridges: Base Protocol Specification," IETF Draft, Jan. 2009.
Perlman, Radia, "Rbridges: Transparent Routing," in Proc. IEEE INFOCOM, Mar. 2004.
Rosen et al., "A Proposed Architecture for MPLS," IETF Network Working Group, Internet Draft draft-ietf-mpls-arch-00.txt, Aug. 1997.
Rosen et al., "MPLS Label Stock Encoding," RFC 3032, Jan. 2001.
Rosenberg et al., "STUN—Simple Traversal of User Datagram Protocol (UDP) Through Network Address Translators (NATs)," Network Working Group, RFC 3489, Mar. 2003, 44 pgs.
Schulzrinne, H., et al., "RTP, A Transport Protocol for Real-Time Applications," Network Working Group RFC3550, Jul. 2003, 98 pages.
Smith, Bradley R., et al., "Securing the Border Gateway Routing Protocol," Global Telecommunications Conference, Nov. 18-22, 1996.
Touch, et al., Transparent Interconnection of Lots of Links (TRILL): Problem and Applicability Statement, RFC 5556, IETF, May 2009.
Townsley, et al., "Layer Two Tunneling Protocol, L2TP," Network Working Group, RFC 2661, Aug. 1999, 75 pages.
U.S. Appl. No. 13/152,200, filed Jun. 2, 2011, entitled "System and Method for Managing Network Traffic Disruption," Inventor(s): Shekher Bulusu, et al.
Ullman, R., "Rap: Internet Route Access Protocol," RFC 1476, Jun. 1993.
USPTO Apr. 2, 2013 Response to Non-Final Office Action dated Jan. 7, 2013 from U.S. Appl. No. 13/160,957.
USPTO May 24, 2013 RCE Response to Final Office Action dated Feb. 27, 2013 from U.S. Appl. No. 12/941,881.
USPTO May 24, 2013 Supplemental Response to Final Office Action dated Feb. 27, 2013 from U.S. Appl. No. 12/941,881.
USPTO May 8, 2013 Final Office Action from U.S. Appl. No. 13/160,957.
USPTO Jun. 14, 2013 Notice of Allowance from U.S. Appl. No. 12/941,881.
USPTO Jun. 20, 2013 Non-Final Office Action from U.S. Appl. No. 13/041,148.
Viswanathan et al., "ARIS: Aggregate Route-Based IP Switching," Internet Draft, Mar. 1997.
Wang, Q. et al., "TCP-Friendly Congestion Control Schemes in the Internet," National Key Lab of Switching Technology and Telecommunication Networks, Beijing University of Posts & Telecommunications; 2001, pp. 211-216; http://www.sics.se/~runtong/11.pdf.
Woundy et al., "ARIS: Aggregate Route-Based IP Switching," Internet Draft draft-woundy-aris-ipswitching-00-txt, Nov. 1996.
U.S. Appl. No. 13/653,814, filed Oct. 17, 2012, entitled "System and Method for Tracking Packets in a Network Environment," Inventor: Wei-Jen Haung.
USPTO Sep. 25, 2012 Non-Final Office Action from U.S. Appl. No. 12/941,881.
USPTO Dec. 11, 2012 Response to Sep. 25, 2012 Non-Final Office Action from U.S. Appl. No. 12/941,881.

(56) References Cited

OTHER PUBLICATIONS

USPTO 2012-26 Final Office Action from U.S. Appl. No. 12/941,881.
USPTO Dec. 26, 2012 Non-Final Office Action from U.S. Appl. No. 12/938,237.
USPTO Feb. 22, 2013 Response to Nov. 26, 2012 Non-Final Office Action from U.S. Appl. No. 12/938,237.
USPTO Mar. 26, 2013 Final Office Action from U.S. Appl. No. 12/938,237.
USPTO Jan. 7, 2013 Non-Final Office Action from U.S. Appl. No. 13/160,957.
"Cisco Nexus 7000 F1 Series 32-Port 1 and 10 Gigabit Ethernet Module," Cisco Systems, Inc., San Jose, CA; Apr. 2013, 7 pages Cisco Nexus 7000 Series 32—Port 1 and 10 Gigabit Ethernet Module Data Sheet.
"Cisco Nexus 7000 Series Documentation Roadmap for NX-OS, Release 5.2," Cisco Systems, Inc., San Jose, CA; Aug. 16, 2011, 4 pages Cisco Nexus 7000 Series Documentation Roadmap for NX-OS, Release 5.2.
"Cisco Nexus 7000 Series NX-05 Troubleshooting Guide—Troubleshooting Tools and Methodology," ©1992-2012 Cisco Systems, Inc.; 26 pages http://docwiki.cisco.com/wiki/Cisco_Nexus_7000_Series_NX-OS_Troubleshooting_Guide_--_Troubleshooting_Tools_and_Methodology#Using_Pong.
"Cisco Nexus 7000 Series NX-0S Release Notes, Release 5.2," Cisco Systems, Inc., San Jose, CA, Sep. 19, 2012; 120 pages Cisco Nexus 7000 Series NX-OS Release Notes, Release 5.2.
"Cisco Nexus 7000 Series NX-OS System Management Configuration Guide, Release 5.x," Cisco Systems, Inc., San Jose, CA; Dec. 2011, 386 pages http://www.cisco.com/en/US/docs/switches/datacenter/sw/5_x/nx-os/system_management/configuration/guide/sm_nx-os.pdf.
"Cisco Nexus Software Release 5.2 for Cisco Nexus 7000 Series Switches," Product Bulletin, Cisco Systems, Inc., San Jose, Ca, Jun. 2012, 7 pages.
Andreasan et al., "RTP No-Op Payload Format," Internet Draft, Internet Engineering Task Force, Feb. 2004, pp. 1-8.
Cheng, Jin et al., "Fast TCP: Motivation, Architecture, Algorithms, Performance," Aug. 2, 2004, 44 pages.
Cisco White Paper, "Network Health Framework: A Proactive Approach," Cisco Systems, Inc., San Jose, CA; Feb. 2010, 8 pages http://www.cisco.com/en/US/services/ps6889/Cisco_NHFWhitePaper.pdf.
Eidson, John, "IEEE-1588 Standard for a Precision Clock Synchronization Protocol for Networked Measurement and Control Systems," Agilent Technologes, Inc., Nov. 10, 2005, 94 pages; http://www.nist.gov/el/isd/ieee/upload/tutorial-basic.pdf.
Fedyk, D., et al., ISIS Extensions Supporting IEEE 802.1aq Shortest Path Bridging, Network Working Group Internet Draft, Mar. 8, 2011, 42 pages; http://tools.ietf.org/html/draft-ietf-isis-ieee-aq-05.
Hirschmann Automation and Control GmbH, White Paper, "Precision Clock Synchronization, The Standard IEEE 1588," Rev. 1.2, 20 pp.; [retrieved and printed Mar. 19, 2013] http://www.belden.com/pdfs/Techpprs/Precision_Clock_Synchronization_WP.pdf.

\* cited by examiner

FIG. 5

| BITS | | | | | | | | OCTETS | OFFSET |
|---|---|---|---|---|---|---|---|---|---|
| 7 | 6 | 5 | 4 | 3 | 2 | 1 | 0 | | |
| TYPE | | | | | | | | 1 | X |
| LENGTH | | | | | | | | 1 | X+1 |
| OFFSET1 | | | | OFFSET2 | | | | 1 | X+2 |
| OFFSET3 | | | | OFFSET4 | | | | 1 | X+3 |
| ⋮ | | | | ⋮ | | | | ⋮ | ⋮ |

| BITS | | | | | | | | OCTETS | OFFSET |
|---|---|---|---|---|---|---|---|---|---|
| 7 | 6 | 5 | 4 | 3 | 2 | 1 | 0 | | |
| transportSpecific | | | | messageType | | | | 1 | 0 |
| RESERVED | | | | versionPTP | | | | 1 | 1 |
| messageLength | | | | | | | | 2 | 2 |
| domainNumber | | | | | | | | 1 | 4 |
| RESERVED | | | | | | | | 1 | 5 |
| FLAGS | | | | | | | | 2 | 6 |
| correctionField | | | | | | | | 8 | 8 |
| RESERVED | | | | | | | | 4 | 16 |
| sourcePortIdentity | | | | | | | | 10 | 20 |
| sequenceId | | | | | | | | 2 | 30 |
| CONTROL | | | | | | | | 1 | 32 |
| logMeanMessageInterval | | | | | | | | 1 | 33 |
| TYPE | | | | | | | | 1 | 34 |
| LENGTH | | | | | | | | 1 | 35 |
| OFFSET1 | | | | OFFSET2 | | | | 1 | 36 |
| OFFSET3 | | | | OFFSET4 | | | | 1 | 37 |
| ⋮ | | | | ⋮ | | | | ⋮ | ⋮ |

70

SYSTEM AND METHOD FOR PROBING MULTIPLE PATHS IN A NETWORK ENVIRONMENT

TECHNICAL FIELD

This disclosure relates in general to the field of communications and, more particularly, to probing multiple paths in a network environment.

BACKGROUND

Ethernet architectures have grown in complexity in recent years. This is due, at least in part, to diverse technologies that have emerged to accommodate a plethora of end users. For example, Data Center Ethernet (DCE) represents an extension to Classical Ethernet (CE), and it can offer a lower cost, lower latency, high-bandwidth configuration. The forwarding methodology adopted by DCE networks is generally scalable and, further, provides forwarding paths with equal-cost multipathing with support for different forwarding topologies. In certain network scenarios, topology information may not be current, accurate, and/or consistent. Optimally probing multiple paths in network topologies presents a significant challenge to system designers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a simplified block diagram illustrating additional details related to an example data structure in accordance with one embodiment;

FIG. 6 is a simplified block diagram illustrating additional details related to an example data structure in accordance with one embodiment.

DETAILED DESCRIPTION OF EXAMPLE EMBODIMENTS

Overview

An example method is provided and can include initiating a probe session at a source network element; identifying multiple paths from the source network element to a destination network element in a network; transmitting packets from the source network element along the multiple paths; compiling a list of network characteristics associated with the multiple paths; and selecting a particular one of the multiple paths for packet routing based on the network characteristics.

In more specific implementations, the method can include revising a previously performed hash based on the network characteristics in order to re-inject particular packets toward the particular one of the multiple paths. In more detailed configurations, the identifying of the multiple paths can further include transmitting specific packets, which have an associated a time-to-live (TTL) value of 1, from the source network element to next-hop network elements; collecting next-hop information at the source network element; and increasing a subsequent TTL value by 1 with a successive transmitting activity until the destination network element is reached.

Note that the network characteristics can include connectivity characteristics, latency characteristics, queuing delay characteristics, quality of service (QoS) characteristics, etc. Additionally, other example scenarios can include inner header values of selected packets being changed in order to route the selected packets along the particular one of the multiple paths. The method can also include changing a port characteristic of selected packets based on the network characteristics such that the selected packets are routed toward the particular one of the multiple paths.

Example Embodiments

Figure 1:
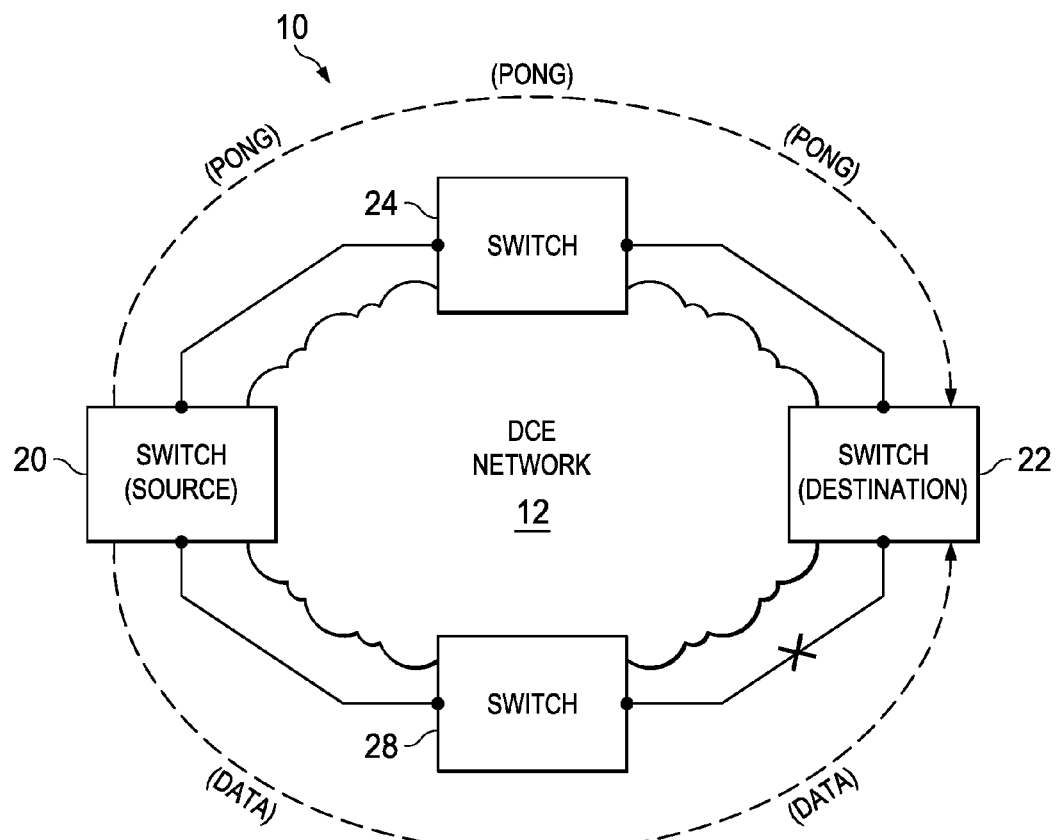
FIG. 1 is a simplified block diagram of a communication system for probing multiple paths in a network environment in accordance with one embodiment of the present disclosure.

Turning to FIG. 1, FIG. 1 is a simplified block diagram of a communication system 10 for probing multiple paths in a network environment in accordance with one embodiment. In certain embodiments, the architecture of FIG. 1 can employ a method for extending a Pong protocol to operate in a network having multiple paths between nodes. This could allow for multiple paths between nodes being intelligently probed, where their respective latency, connectivity, queuing delays, etc. can be effectively diagnosed.

FIG. 1 may include a Data Center Ethernet (DCE) network 12. Additionally, FIG. 1 may include switches 20, 22, 24, 28 operating within DCE network 12. Switches 20, 22, 24, 28 may be coupled to each other via various communication links that may be wired or wireless. In one particular example, switch 20 may transmit data information (e.g., data packets and/or data frames) to switch 22. In such a scenario, switch 20 could be considered the source switch, while switch 22 would be the destination. As shown in FIG. 1, data information traveling from source switch 20 to destination switch 22 could travel two different paths; one through switch 24 and one through switch 28. Stated in different terminology, there are multiple paths from source switch 20 to destination switch 22, where such a topology is typical in most networking environments.

Note that link state routing is a protocol that allows a node in a network to determine network topology by sharing information about transmission cost to each of its neighboring nodes. Link state routing packets are transmitted to (and received from) neighbors. The least expensive path to various destinations can be determined using the link state information. Link state information can be used to generate network topology information at various network nodes (e.g., used in constructing forwarding tables). The forwarding tables allow network nodes (such as switches and bridges) to forward the received traffic on an appropriate output interface. In order to generate a network topology map and a forwarding table at a specific node, link state information is distributed from various network nodes. Each network node is configured to create a link state packet having information about the distance, delay, or cost to each of its neighbors. A link state record (LSR) can then be transmitted to neighboring nodes.

DCE networks commonly use a routing protocol (e.g., intermediate system to intermediate system (IS-IS)) for forwarding purposes, where Classic Ethernet (CE) networks commonly use a spanning tree protocol (STP) as their forwarding protocol. In one particular example, DCE network 12 is representative of a Layer 2 multipathing network, which may be executing the IS-IS forwarding protocol. In the illustration of FIG. 1, switches 20-28 can be executing an IS-IS protocol on their respective links.

Network management, and more specifically network monitoring, is useful to manage the performance of networks. Various network-monitoring tools exist to assist in diagnosing and analyzing the health of networks. Pong and Internet Control Message Protocol (ICMP) Ping are two such network diagnostics tools that can assist with detecting network connectivity issues, and that can generate various network measurement metrics (including network latency). There are some notable distinctions between Pong and Ping; Pong can work directly over Layer 2 (e.g., over protocols such as Ethernet), while Ping operates with Layer 3 devices. Pong may also provide fine-grained network monitoring by allowing hop-by-hop latency measurements, as well as the measurement of the intra-chassis delay at every hop. For latency measurements, Pong packets may be timestamped in hardware at ingress and egress ports, whereas Ping packets are processed at the software layer. Since data packets are typically forwarded in hardware in modern Layer 2 or Layer 3 devices, Pong may provide more accurate latency measurements, as encountered by data flowing through a network.

Implementing Pong in a DCE network presents new and additional challenges. Pong is sufficient for Layer 2 protocols such as CE, where forwarding algorithms (such as STP) ensure the existence of only a single distinct forwarding path between any two nodes. Thus, a Pong probe in a CE network can be sent from a source node to a destination node to measure the latency of the path. Since STP does not guarantee efficient utilization of all links available in a network, variants of IP protocols such as IS-IS have been proposed and developed to find multiple Equal Cost Multiple Paths (ECMPs) between any two nodes in DCE networks. Based on certain hardware configurations, data packets from a source node to a destination node can be hashed and then sent on a specific path.

Typically, a flow is defined based on certain parameters in the data packet headers (e.g., source address, destination address, port etc.), where packets in a flow are hashed and sent along a particular path. These activities pose an interesting dilemma for the Pong protocol. For example, connectivity problems can exist on certain paths, and not be present on others such that when Pong probes are sent out, the architecture cannot find and/or locate the problem on faulty paths. These problematic paths may be currently used by certain flows, whose packets are vulnerable to being dropped, lost, misrouted, etc. To address these shortcomings, extensions to Pong can be provisioned to allow a network-monitoring tool to probe different ECMPs from a source to a destination node, as discussed more fully below.

Note that a similar problem exists with ICMP Ping when there are multiple paths present in the IP network. For example, RFC 4379 provides a mechanism (implemented in [MPLSTrace] in IOS) for testing multiple LSPs between a source and a destination by using a modification of IP traceroute utility, where the router at each hop provides some information on how its downstream paths towards a particular destination can be exercised. Subsequently, the ingress can send MPLS Ping requests that exercise these paths. The idea is based on the concept that forwarding on a Forwarding Equivalence Class (FEC) is based on a MPLS label, but exercising multiple paths in the FEC is based on a hash of the source/destination IP and the transport layer source and destination port fields. Such an approach has certain drawbacks that inhibit the performance of the architecture.

Returning to FIG. 1, data information (e.g., data packets and/or data frames) sent from source switch 20 to destination switch 22 can travel through multiple paths (e.g., through switch 24 or switch 28). As indicated by the 'X', when a link issue (e.g., link failure or link degradation) develops between switch 28 and destination switch 22, certain data information (sent from source switch 20 to destination switch 22) could not reach destination switch 22 (i.e., the data gets lost) or it could be severely delayed. Unfortunately, current implementations of Pong in a DCE network would not guarantee that a Pong probe would travel the path on which the connection issue arose; hence, the issue would not be diagnosed. As indicated by a dashed arrow in FIG. 1, after a Pong probe is hashed in source switch 20, the path from source switch 20 to destination switch 22 could be the path through switch 24. A Pong probe transmitted on the path that includes switch 24 would not diagnose the link issue between switch 28 and destination switch 22. Meanwhile, the hashing process could continue to select the path from source switch 20 to destination switch 22 that includes switch 28 (as indicated by a second dashed line in FIG. 1).

Figure 2:
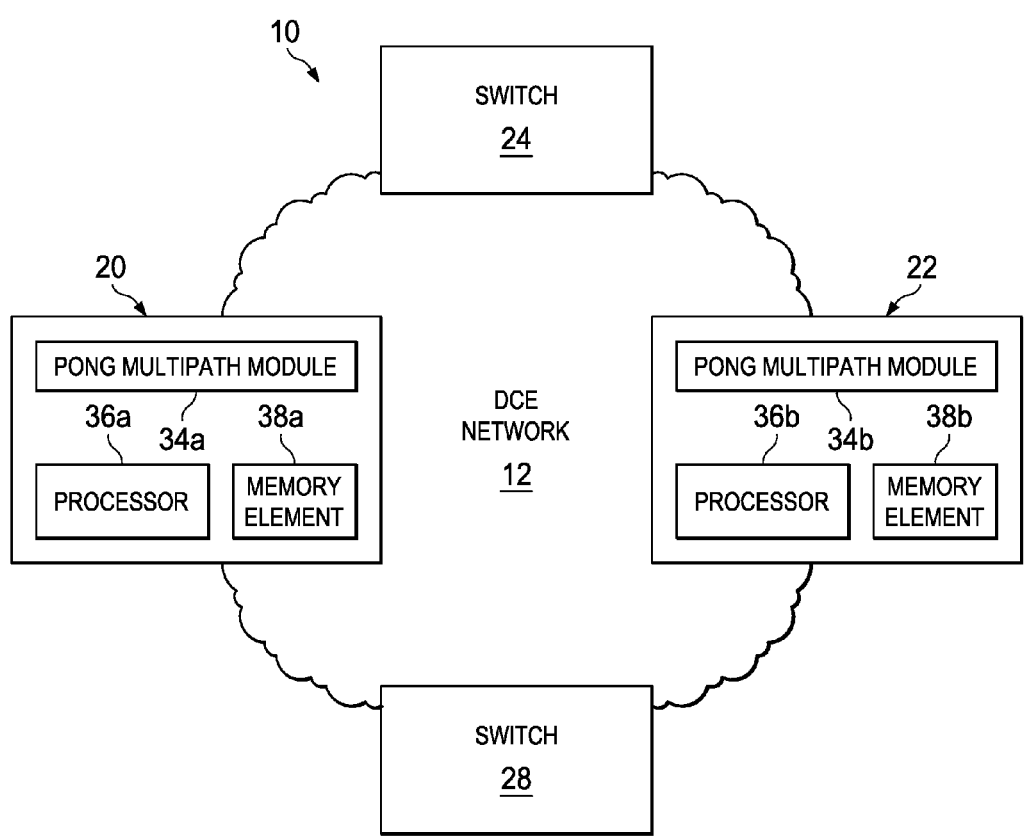
FIG. 2 is a simplified block diagram illustrating additional details related to the communication system in accordance with one embodiment.

Turning to FIG. 2, FIG. 2 is a simplified block diagram illustrating potential details associated with communication system 10. In this particular example, switches 20 and 22 include a respective Pong multipath module 34a-b, a respective processor 36a-b, and a respective memory element 38a-b. Note that although not depicted, switches 24 and 28 may also be configured to include respective Pong multipath modules, processors, and memory elements. In operation of one example scenario, the architecture of FIG. 2 can systematically evaluate multiple paths between the source and a given destination address in order to appropriately measure connectivity, latency, etc. (and other characteristics) for all the possible network paths. This stands in contrast to simply measuring connectivity or latency along a single path. Logistically, a given end user would seek to probe toward a particular IP destination address. Hence, a first step in the operational activities of the architecture involves identifying/discovering all the paths that could lead to that particular IP destination address. Essentially, this can be viewed as the trace route portion of the solution. Note that part of this evaluation can include evaluating paths that may be less CPU intensive.

Once the paths are known, the probe packets can be sent along each of those paths (i.e., representing the second stage of the solution). Furthermore, this can entail identifying the connectivity parameters for those paths. The objective in such activities is to ensure that all multipaths are exercised for a given Pong probe session. In the context of routing activities involving a source switch, once a probe session is initiated on the network element (e.g., a source switch), then the source switch would attempt to figure out all the next hops toward the destination IP. Packets can then be sent from the source switch along each of the paths. The source switch can then receive responses from the packets and, subsequently, compile a list of results. The measurements would reflect network characteristics for each of the paths (e.g., the connectivity characteristics, latency characteristics, quality of service (QoS) characteristics, queuing delays, or any other suitable network characteristics that could be used as a basis for executing a routing decision).

This measurement information (i.e., the network characteristics for the paths) is effectively being summarized to offer the user a comprehensive view of the network for that Pong session (e.g., which paths are connected, which paths are suffering latency issues, etc.). Additionally, hashing can be employed to choose the appropriate path using the collected information. For example, the architecture can revise the hash and then re-inject the packet toward an appropriate path. Hence, instead of relying on the internal hardware's capability to make path decisions (e.g., using a hash of the 5-tuple parameters), the architecture can revise the hash (e.g., override the hash using a pre-computed hash) in order to make a more intelligent decision about which path a given packet should take. Additional details relating to these activities are provided below in the context of several network scenarios.

Returning to some of the infrastructure of FIG. 2, FIG. 2 depicts a cloud that forms a switching network, where a cloud can be defined as a set of one of more network switches/bridges and end hosts: all of which may be interconnected (wired or wirelessly). Further, DCE network 12 represents a series of points or nodes of interconnected communication paths for receiving and transmitting packets of information that propagate through communication system 10. This network offers a communicative interface between network elements (e.g., switches, bridges, gateways, etc.) and may be any IP network, local area network (LAN), virtual LAN (VLAN), wireless LAN (WLAN), metropolitan area network (MAN), wide area network (WAN), extranet, Intranet, virtual private network (VPN), or any other appropriate architecture or system that facilitates communications in a network environment. The network can support a transmission control protocol (TCP)/IP, or a user datagram protocol (UDP)/IP in particular embodiments of the present disclosure; however, this network may alternatively implement any other suitable communication protocol for transmitting and receiving data packets within communication system 10.

Switches 20-28 are network elements that route (or that cooperate with each other in order to route) traffic and/or packets in a network environment. As used herein in this Specification, the term 'network element' is used interchangeably with the terms 'switch' and 'node', and these terms are meant to encompass gateways, switches, routers, bridges, loadbalancers, firewalls, inline service nodes, proxies, servers, processors, modules, or any other suitable device, component, element, or object operable to exchange information in a network environment. The network elements may include any suitable hardware, software, components, modules, interfaces, or objects that facilitate the operations thereof. This may be inclusive of appropriate algorithms and communication protocols that allow for the effective exchange (reception and/or transmission) of data or information.

In operation, Pong multipath modules 34a-b may be configured to coordinate probing multiple paths in DCE network 12. The Pong multipath modules 34a-b can learn multiple paths (e.g., ECMPs) between a source switch (e.g., switch 20) and a destination switch (e.g., switch 22). Further, Pong multipath modules 34a-b can coordinate transmitting Pong probe frames on a desired path, as well as receiving those Pong probe frames. Additionally, Pong multipath modules 34a-b may be configured to facilitate modifying inner header values of Pong probe frames (e.g., the inner destination address and source address) to ensure that Pong probe frames are transmitted on a desired path. Moreover, Pong multipath modules 34a-b may be configured to modify Pong probe frames to add network measurement metrics as those frames flow through a network. Processors 36a-b may execute code stored in memory elements 38a-b and/or assist in any of the switching activities discussed herein.

Note that switches 20-28 may share (or coordinate) certain processing operations. Using a similar rationale, their respective memory elements may store, maintain, and/or update data in any number of possible manners. In a general sense, the arrangement depicted in FIG. 2 may be more logical in its representations, whereas a physical architecture may include various permutations/combinations/hybrids of these elements. In one example implementation, switches 20-28 include software (e.g., as part of Pong multipath modules 34a-b) to achieve the multipath probing, as outlined herein in this document. In other embodiments, this feature may be provided externally to any of the aforementioned elements, or included in some other network element (or in a proprietary element) to achieve this intended functionality. Alternatively, several elements may include software (or reciprocating software) that can coordinate in order to achieve the operations, as outlined herein.

Figure 3:
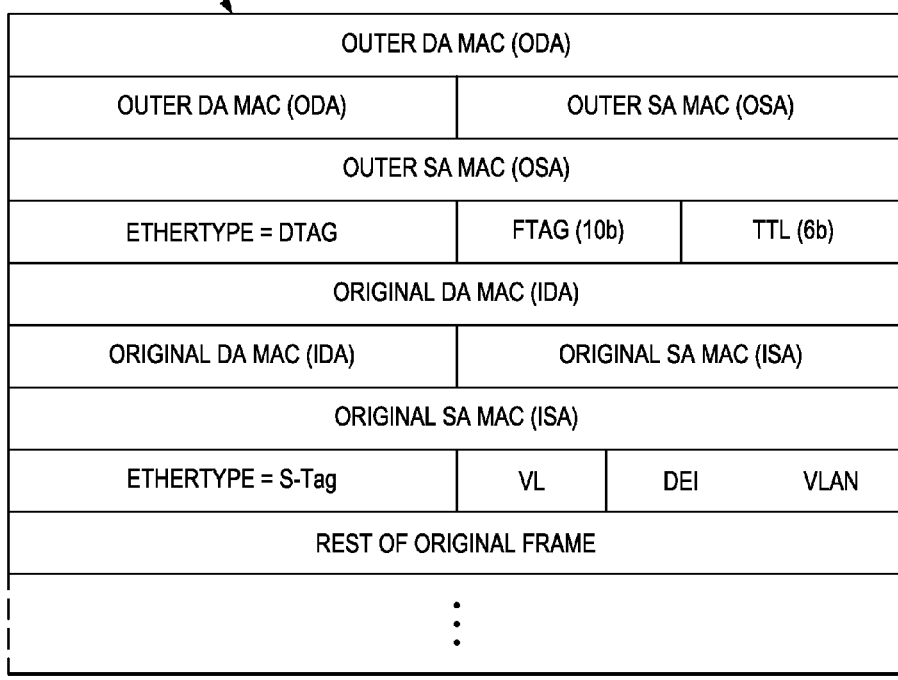
FIG. 3 is a simplified block diagram illustrating an example data structure in accordance with one embodiment.

Illustrated in FIG. 3 is an example DCE MAC-in-MAC header 40 for data information (e.g., data packets and/or data frames) transmitted in DCE networks. In DCE networks, forwarding is based on the outer switch address in the hierarchical MAC-in-MAC header. An ECMP hash to determine a next-hop node can rely on the inner destination address and source address (DA/SA), as well as the Ethertype for Layer 2 packets or inner IP fields for Layer 3 packets. Therefore, by manipulating the inner header values, data information can be transmitted on specific ECMPs. Stated in different terminology, it is possible to ensure that data information travels a specific path from a source node to a destination node by modifying the inner header values of the data information at intermediate nodes.

In an example implementation of Pong, transmitting a Pong probe on a path includes transmitting a Pong DSync frame, which is parsed by the hardware of a receiving node. The DSysnc frame can be timestamped at the ingress and egress ports of various nodes, as it flows through the network. A DFollow-Up frame follows the DSync frame and it can be processed by software at each hop. The timestamps incurred by the DSync frames can be added to the DFollow-Up frame. The timestamps stored in hardware can include a signature of the DSync frame, which can be matched to the DFollow-Up frame corresponding to the DSync frame. When the DFollow-Up frame reaches the destination node, a reverse loopback DSync frame and reverse loopback DFollow-Up frame can be generated towards the source node that originated the Pong DSync frame. The reverse DFollow-Up frame may include the timestamps incurred both in the forward and loopback directions.

When a DSync frame is received at an ingress port of a node, the frame may continue to be forwarded through the node hardware or be intercepted and redirected to a supervisor or management module (e.g., the Pong multipath modules of FIG. 2). The supervisor module can direct a node line-card CPU to re-inject (e.g., regenerate) a frame back into the ingress port, which can again generate a timestamp. The re-injected DSync frame may then be forwarded through the node hardware according to inner header values in the frame header (e.g., source address, destination address, Ethertype, etc.).

Using the Pong DSync frame regeneration feature, intermediate nodes may explicitly designate (by modifying the inner header parameters) which next-hop the frame should be forwarded to, if there are multiple next-hops to reach a destination node. Additionally, intermediate nodes may determine the next-hop node independently of the nodes preceding or succeeding it on the path to a destination. This is different from Ping as implemented in Multiprotocol Label Switching (MPLS) network environments, which requires an intermediate node to choose from a set of destination IP addresses provided to it by the preceding node on the path. Further, MPLS Ping includes the risk of a node not transmitting sufficient destination IP addresses to its downstream neighbor to allow the neighbor to map those IP addresses to its own downstream hops (e.g., not all paths can be probed).

Another advantage of using the Pong DSync frame regeneration feature is that a node may statically compute the inner packet header parameter, which can map to a specific next-hop for a particular destination. The next-hop information can be stored at each node, which will alleviate the need for dynamically simulating the hardware to determine which inner packet header values (provided to a node by an upstream neighbor) would map to certain next-hops (as done in MPLS Ping).

In one instance, probing multiple paths in a DCE network from a source node to a destination node can include querying multiple paths to understand the number of ECMPs from the source node to the destination node. The source node transmits a frame with a time to live (TTL) value equal to 1 to each of the next-hops towards a destination. Each of the next-hops transmits (back to the source) node the number of next-hops it has towards the destination node. The source node transmits another frame with the TTL value increased by 1 to each next-hop node, which transmits the frame to each of its next-hops towards the destination node. This succeeding level of next-hop nodes transmits (back to the source node) the number of next-hops it has towards the destination node. This process can be repeated: increasing the TTL value until the destination node is reached. The process allows a source node to identify specific ECMPs to a destination node that can be probed to measure network measurements. Unlike similar path probing approaches, an advantage of this approach is that intermediate nodes transmit (back to the source node) the number of next-hops available towards a destination node, which minimizes the processing of information by the node.

To probe any specific ECMP, the source node may transmit two frames towards a destination node: a Pong DSync frame and a Pong DFollow-Up frame. The DFollow-Up frame may contain the source route in a type-length-value (TLV) for the particular ECMP the source node seeks to probe. At the next-hop node (and each subsequent intermediate node), the DSync frame is received by the ingress port and may be timestamped. The next-hop node may also receive the DFollow-Up frame with the TLV at its ingress port. Using the TLV in the DFollow-Up frame, the intermediate node may look-up and rewrite the inner frame header values of the DSync frame so that if the DSync frame is put back (e.g., re-injected) at the ingress port, the DSync frame will be transmitted towards the next-hop node provided in the source route (e.g., the route identified in the TLV of the DFollow-Up frame). Once the inner header values of the DSync frame are modified, the DSync frame may be injected back into the ingress port. The DSync frame can then continue through the hardware forwarding. The timestamp information stamped on the DSync frame may be inserted into the DFollow-Up frame, along with the node and port information where the timestamp was performed.

The process can be repeated at the intermediate nodes until the DSync and DFollow-Up frames reach the destination node. Once the frames reach the destination node, the destination node can determine that the DSync and DFollow-Up frames are addressed to it by the outer destination addresses in each frame. A loopback frame may be generated by the destination node and transmitted back to the source node. If measurements of network metrics (e.g., network latency) are merely desired for a specific ECMP from the source node to the destination node, the reverse loopback frame can take any route from the destination node to the source node. When the loopback DSync and DFollow-Up frames reach the source node, the source node can determine (from the outer destination address of each frame) that they are addressed to it. Thus, the source node would not continue to forward the frames in this example. The DFollow-Up frame may carry the timestamp information, as well as the node and port information where the information was collected. The first timestamp record in the DFollow-Up frame can include identification information associated with the source node (i.e., the node that originated the probe). This can allow the source node to recognize the frames as responses to the Pong probe originated by the source node itself.

The described approach allows a source node to probe and collect network measurement metrics for any ECMP to a destination node. Additionally, there are numerous advantages to the described probing approach. As mentioned above, the processing load experienced by intermediate nodes (between a source node and destination node) is minimized during the process of determining the existence of ECMPs. There is minimal computation overhead on the intermediate node to dynamically simulate which of a potentially large set of inner frame header parameters would map to particular next-hops. The parameters used to exercise a particular next-hop for a particular destination can be statically computed. Additionally, unlike MPLS Ping, the described approach can probe all available ECMPs because there is no coupling of parameter choices between nodes.

Additionally, the ability of intermediate nodes to intercept the probe frames at the ingress port and re-inject them into the ingress port after modifying the inner frame headers, allows the probe frames to collect accurate latency measurements. The probe frames can be forwarded through the network and nodes in a fashion similar to that in which data frames are forwarded. As the probe frames are timestamped, metrics associated with the forwarding table programming and multipath hash tables can be measured. Re-injecting probe frames at the ingress port can allow for suitable probing activities, where appropriate metrics associated with inter-chassis delay can be collected.

In addition, some of the example approaches being outlined do not necessarily involve modifying internal system headers (such as Cisco Systems Data Center 3.0 system headers) to force a probe frame being sent out of a specific egress port. Instead, a probe frame can follow the existing hardware forwarding tables, where multipath hashing can be computed, and the result of these processes would systematically transmit the probe frame out of the specific port (towards the next-hop node in a desired source route). Separately, it should be noted that the preceding example embodiments have described implementations within DCE networks. The described approach can equally be implemented in other network architectures that use outer and inner frame headers, where forwarding can be determined by the outer headers, and the ECMPs can be determined by the inner headers. Subsequently, frames can be re-injected into the ingress port and suitably timestamped, as discussed herein.

An additional example embodiment of probing multiple ECMPs can focus on a hardware-based implementation of source routing (e.g., an embodiment that does not necessarily involve transmitting the probe frames to the supervisor (e.g., the Pong multipath modules of FIG. 2)), and/or a supervisor re-injecting the probe frames back into the ingress port. In other instances, some hybrid solution may be provisioned, where that architecture includes various hardware and software aspects, as detail herein.

Figure 4:
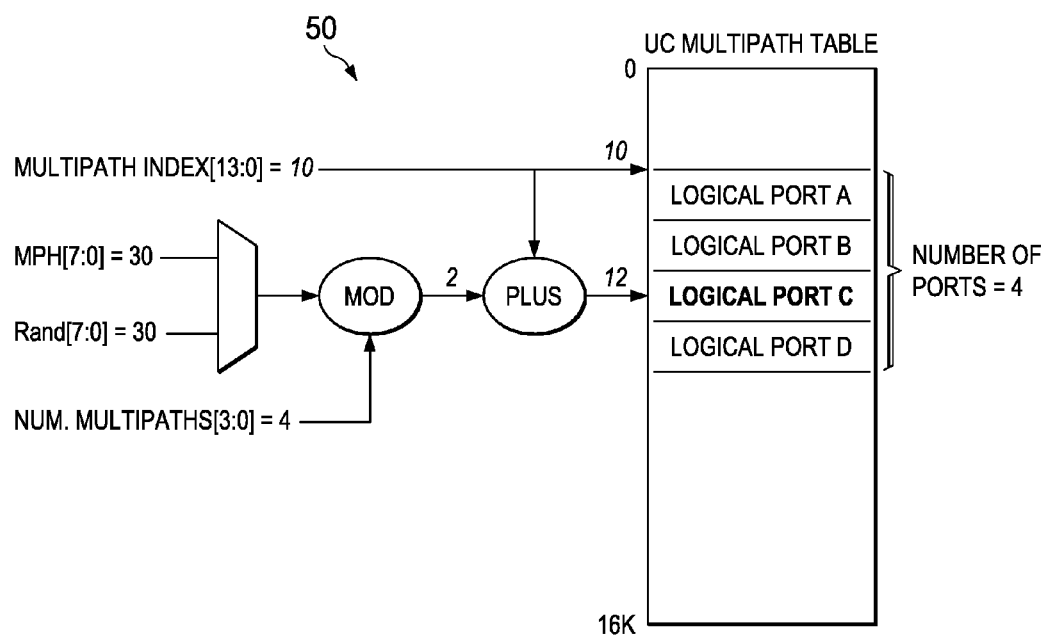
FIG. 4 is a simplified block diagram illustrating details related to the communication system in accordance with one embodiment.

Turning to FIG. 4, FIG. 4 is a simplified block diagram illustrating multipath selection activities 50. Certain implementations of DCE application specific integrated circuits (ASICs) may provide for multipathing based on the destination node. When the destination node is identified to be non-local, the ASICs loadbalance the frames amongst the available paths based on the flow of the frame. Further, the DCE ASICs may allow several multipaths per destination node (e.g., 16 multipaths). A multipath may be selected using a multipath hash based on flow parameters in the data frame. The outer destination address of a frame is used to index into a multipath table for possible next-hops for that destination, and a multipath hash can be computed to select a particular entry out of the possible next-hops.

In certain example architectures, a hardware-based source routing embodiment may be implemented by providing (e.g., in a probe frame) the offset information for each next-hop along a desired path. In this manner, each intermediate node does not need to compute the offset to select a particular next-hop based on hashing the flow parameters within a probe frame.

In operation, the source node may transmit control-plane frames to its next-hop neighbors en route to a particular destination node. The neighbors could transmit (back to the source node) the next-hop options for the destination node, along with the offset that selects each of those next-hops. The offset information may be obtained from the unicast Layer 2 routing information base (U2RIB) of the node. The node should maintain the same ordering of the next-hops in the U2RIB as it does in the forwarding information base (FIB) in the multipath table of the node to ensure consistency.

Similar to the previously described embodiment, the source node can transmit control-plane frames to each successive next-hop nodes towards the destination node. The next-hop nodes transmit the offset information of each of its next-hops to the source node. The process can be repeated until the destination node is reached: providing the ECMPs from the source node to the destination node. The source node can collect the returned next-hop information, and may select a specific path to transmit a Pong probe.

FIG. 5 is an example TLV 60 included in a Pong Dysnc frame for hardware-based source routing. In this scenario, the source node can construct Pong DSync and DFollow-Up frames that may include a type-length-value (TLV), which can specify a path to be followed. TLV 60 can include a type field signifying a source-routed Pong frame, along with a length field with an optional pointer (as explained below, a time-to-live field in the DCE header could also be used). TLV 60 also may include a plurality of offset fields (e.g., 4-bit offset fields). It may take multiple (e.g., 16) index values to select a particular ECMP. Each offset value can specify the index to the multipath table to be used by the corresponding next-hop node. The first offset value could specify the index to the multipath table to be used at the first next-hop (from a source node to a destination node). The second offset value can specify the index to the multipath table to be used at the next-hop node (after the first next-hop node, etc.).

TLV 60 of a Pong probe frame can carry the end-to-end route information of a specific path from a source node to a destination node. At each next-hop, the hardware can recognize that the Pong probe frame is source-routed through the type field of the TLV. The length field of the TLV may specify the length in bytes of the TLV. A pointer field may specify (at each receiving intermediate node) the offset to consider to index into that node's multipath table. Each intermediate node can use the specific offset to index into the multipath table for the destination node address provided in the Ethernet header. An alternative implementation to employing a pointer could include using the TTL field of a DCE header. Note that when the maximum number of hops a Pong probe frame takes (to a destination node) is fixed, the source node may put the maximum number of hops in the TTL, before transmitting the Pong probe frames. The hardware at the intermediate nodes can use a value generated by subtracting the current TTL from the maximum number of hops, which allows indexing into the offset list. After finding the label information base (LIB) for the next-hop node from the multipath table, the TTL can be suitably decremented.

FIG. 6 illustrates an example Pong probe frame 70 that can be provisioned for hardware-based source routing in one example scenario. The Pong probe frame may have the Pong header, as well as a TLV portion (as illustrated in FIG. 5). IEEE 1588 allows for TLV attachments to 1588 packets, where such formats may readily leverage the Pong protocol. As with the embodiment described above, after a specific ECMP is identified for probing, a source node may transmit two Pong probe frames: a DSync frame that may be hardware forwarded and that may be timestamped at each hop, and a DFollow-Up frame, which may collect the timestamps. A similar timestamping mechanism (as described above) can be used by each ingress and egress port of the nodes (from the source node to the destination node). Once hardware-based Pong probe frames reach the destination node, the destination can transmit the frames back to the source destination.

Note that a hardware-based approach can have several advantages. First, at each intermediate node along a Pong probe path, there is generally less computational overhead. In certain example implementations, because offsets are contained within the probe frame, an intermediate node would not need to perform hashing to calculate the next-hop. Further, the node would not need to calculate and modify inner header values of the probe frames (e.g., inner source and destination addresses).

Figure 7:
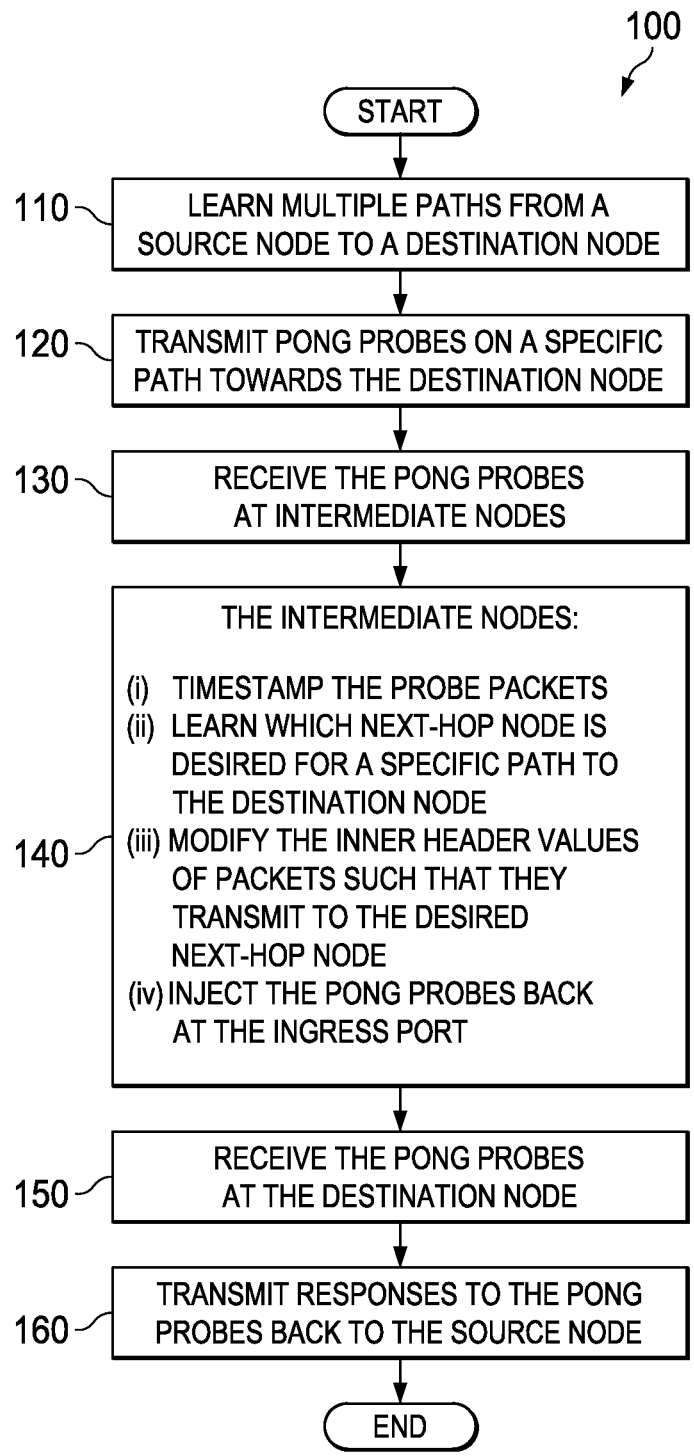
FIG. 7 is a simplified flowchart illustrating example operations for a flow associated with the communication system.

Turning to FIG. 7, FIG. 7 is a simplified flowchart 100 illustrating one example activity that could be accommodated by communication system 10. At 110, multiple paths are identified from the source node to a destination node. The term identifying in this context can include evaluating, discovering, looking up, etc. the paths. In 120, Pong probes are transmitted on a specific path toward the destination. At 130, the Pong probes are received at intermediate nodes in the network. Any number of activities can occur at these intermediate nodes. For example, at 140, the intermediate nodes timestamp the probe packets; learn (from the Pong probes) which next hop node is desired for the specific path to the destination node; modify the inner header values of the packets (i.e., such that they are transmitted along the desired next hop node); and inject the Pong probes back at the ingress port. At 150, the Pong probes are received at the destination node.

At 160, responses to the Pong probes can be communicated back to the source node. The responses can be compiled (which is inclusive of aggregating, collecting, summarizing, etc.) in order to identify an appropriate path for particular packets. Hence, a particular one of the paths is selected based on the network characteristics that were selected. These selection activities can include revising a previously performed hash in order to re-inject particular packets toward the particular one of the paths, which was selected based on the network characteristics that were solicited. Those measurements (e.g., the network characteristics associated with latency, connectivity, queuing delay, etc.) can be used as a suitable basis for selecting an appropriate path. In certain cases, these measurements can be part of an algorithm/hash that selects an appropriate path for packets, where other factors could also be considered along with these network characteristics in making this selection.

Note that in certain example implementations, the multipath probing outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.). In some of these instances, a memory element (as shown in FIG. 2) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, Pong multipath modules 34*a-b* include software in order to achieve the multipath probing outlined herein. These activities can be facilitated by switches 20-28, and/or any of the elements of FIGS. 1-2. Switches 20-28 can include memory elements for storing information to be used in achieving the intelligent switching control, as outlined herein. Additionally, switches 20-28 may include a processor that can execute software or an algorithm to perform the switching activities, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of clouds, networks, and/or switches, as well as more complicated/sophisticated arrangements and configurations. Accordingly, the examples provided herein should not limit the scope or inhibit the broad teachings of communication system 10 as potentially applied to a myriad of other architectures. Additionally, although described with reference to particular scenarios where Pong multipath modules 34*a-b* are provided separately, these modules can be consolidated or combined in any suitable fashion, or provided in a single proprietary unit.

It is also important to note that the activities discussed with reference to FIGS. 1-7 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in networking environments or arrangements, the present disclosure may be used in any communications environment that could benefit from such technology. Virtually any configuration that seeks to intelligently probe multiple network paths and/or switch packets could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   initiating a probe session at a source network element;
   identifying equal cost multiple paths from the source network element to a destination network element in a network by tracing routes over the equal cost multiple paths from the source network element to the destination element;
   transmitting packets from the source network element along the equal cost multiple paths;
   compiling a list of network characteristics associated with the equal cost multiple paths;
   selecting a particular one of the equal cost multiple paths for packet routing based on the network characteristics; and
   revising a previously performed hash with a different hash based on the network characteristics to re-inject particular packets toward the particular one of the equal cost multiple paths, wherein the different hash corresponds to the particular one of the equal cost multiple paths selected for packet routing.

2. The method of claim 1, wherein:
   revising a previously performed hash with a different hash to re-inject particular packets towards the particular one of the equal cost multiple paths comprises designating using the different hash which next-hop network element particular packets are forwarded to if there are multiple next-hop network elements to reach the destination network element.

3. The method of claim 1, wherein identifying the multiple paths further comprises:

transmitting specific packets, which have an associated a time-to-live (TTL) value of 1, from the source network element to next-hop network elements;

collecting next-hop information at the source network element; and increasing a subsequent TTL value by 1 with a successive transmitting activity until the destination network element is reached.

4. The method of claim 1, wherein the network characteristics are selected from a group of characteristics, the group of characteristics consisting of:
   a) connectivity characteristics;
   b) latency characteristics;
   c) queuing delay characteristics; and
   d) quality of service (QoS) characteristics.

5. The method of claim 1, wherein inner header values of selected packets are changed to different inner header values in order to route the selected packets along the particular one of the equal cost multiple paths, wherein the different inner header values comprises offset values corresponding to the particular one of the equal cost multiple paths.

6. The method of claim 1, further comprising:
   changing a port characteristic of selected packets based on the network characteristics such that the selected packets are routed toward the particular one of the multiple paths.

7. The method of claim 1, wherein the network includes a Data Center Ethernet (DCE) network.

8. Logic encoded in non-transitory computer-readable media that includes code for execution and when executed by a processor operable to perform operations comprising:
   initiating a probe session at a source network element;
   identifying equal cost multiple paths from the source network element to a destination network element in a network by tracing routes over the equal cost multiple paths from the source network element to the destination element;
   transmitting packets from the source network element along the equal cost multiple paths;
   compiling a list of network characteristics associated with the equal cost multiple paths;
   selecting a particular one of the equal cost multiple paths for packet routing based on the network characteristics; and
   revising a previously performed hash with a different hash based on the network characteristics to re-inject particular packets toward the particular one of the equal cost multiple paths, wherein the different hash corresponds to the particular one of the equal cost multiple paths selected for packet routing.

9. The logic of claim 8, wherein:
   revising a previously performed hash with a different hash to re-inject particular packets towards the particular one of the equal cost multiple paths comprises designating using the different hash which next-hop network element particular packets are forwarded to if there are multiple next-hop network elements to reach the destination network element.

10. The logic of claim 8, wherein identifying the multiple paths further comprises:
    transmitting specific packets, which have an associated a time-to-live (TTL) value of 1, from the source network element to next-hop network elements;
    collecting next-hop information at the source network element; and
    increasing a subsequent TTL value by 1 with a successive transmitting activity until the destination network element is reached.

11. The logic of claim 8, wherein inner header values of selected packets are changed to different inner header values in order to route the selected packets along the particular one of the equal costs multiple paths, wherein the different inner header values comprises offset values corresponding to the particular one of the equal cost multiple paths.

12. The logic of claim 8, the operations further comprising:
    changing a port characteristic of selected packets based on the network characteristics such that the selected packets are routed toward the particular one of the multiple paths.

13. The logic of claim 8, wherein the network includes a Data Center Ethernet (DCE) network.

14. An apparatus, comprising:
    a memory element configured to store electronic code;
    a processor operable to execute instructions associated with the electronic code; and
    a multipath module configured to interface with the processor such that the apparatus is configured for:
    initiating a probe session at a source network element;
    identifying equal cost multiple paths from the source network element to a destination network element in a network by tracing routes over the equal cost multiple paths from the source network element to the destination element;
    transmitting packets from the source network element along the equal cost multiple paths;
    compiling a list of network characteristics associated with the equal cost multiple paths;
    selecting a particular one of the equal cost multiple paths for packet routing based on the network characteristics; and
    revising a previously performed hash with a different hash based on the network characteristics to re-inject particular packets toward the particular one of the equal cost multiple paths, wherein the different hash corresponds to the particular one of the equal cost multiple paths selected for packet routing.

15. The apparatus of claim 14, wherein:
    revising a previously performed hash with a different hash to re-inject particular packets towards the particular one of the equal cost multiple paths comprises designating using the different hash which next-hop network element particular packets are forwarded to if there are multiple next-hop network elements to reach the destination network element.

16. The apparatus of claim 14, wherein identifying the multiple paths further comprises:
    transmitting specific packets, which have an associated a time-to-live (TTL) value of 1, from the source network element to next-hop network elements;
    collecting next-hop information at the source network element; and
    increasing a subsequent TTL value by 1 with a successive transmitting activity until the destination network element is reached.

17. The apparatus of claim 14, wherein the network characteristics are selected from a group of characteristics, the group of characteristics consisting of:
    e) connectivity characteristics;
    f) latency characteristics;
    g) queuing delay characteristics; and
    h) quality of service (QoS) characteristics.

18. The apparatus of claim 14, wherein inner header values of selected packets are changed to different inner header values in order to route the selected packets along the particular one of the equal costs multiple paths, wherein the different inner header values comprises offset values corresponding to the particular one of the equal cost multiple paths.

19. The apparatus of claim 14, the apparatus being further configured for:
 changing a port characteristic of selected packets based on the network characteristics such that the selected packets are routed toward the particular one of the multiple paths.

20. The apparatus of claim 14, wherein the network includes a Data Center Ethernet (DCE) network.

* * * * *